US008164616B2

(12) United States Patent  (10) Patent No.: US 8,164,616 B2
Sakai  (45) Date of Patent: Apr. 24, 2012

(54) VIDEO CONFERENCE SYSTEM

(76) Inventor: Yakichiro Sakai, Tokyo (JP)

( * ) Notice: Subject to any disclaimer, the term of this patent is extended or adjusted under 35 U.S.C. 154(b) by 884 days.

(21) Appl. No.: 11/912,245

(22) PCT Filed: Apr. 17, 2006

(86) PCT No.: PCT/JP2006/308054
§ 371 (c)(1),
(2), (4) Date: Sep. 22, 2008

(87) PCT Pub. No.: WO2006/115096
PCT Pub. Date: Nov. 2, 2006

(65) Prior Publication Data
US 2009/0027483 A1    Jan. 29, 2009

(30) Foreign Application Priority Data
Apr. 21, 2005  (JP) .................................. 2005-123932

(51) Int. Cl.
*H04N 7/14*   (2006.01)
(52) U.S. Cl. ................ 348/14.08; 348/14.09; 348/14.01
(58) Field of Classification Search .... 348/14.01–14.03, 348/14.05, 14.07–14.09, 14.1, 14.16
See application file for complete search history.

(56) References Cited

U.S. PATENT DOCUMENTS

| | | | |
|---|---|---|---|
| 5,594,859 | A | 1/1997 | Palmer et al. |
| 5,999,208 | A | 12/1999 | McNerney et al. |
| 2001/0017665 | A1 | 8/2001 | Ackermann et al. |
| 2003/0058806 | A1 | 3/2003 | Meyerson et al. |
| 2003/0171938 | A1 | 9/2003 | Lee et al. |
| 2005/0015444 | A1 | 1/2005 | Rambo |

FOREIGN PATENT DOCUMENTS

| | | |
|---|---|---|
| CN | 1381119 A | 11/2002 |
| EP | 1 381 237 A2 | 1/2004 |
| EP | 1 381 237 A3 | 1/2004 |
| JP | 4-140990 A | 5/1992 |
| JP | 5-137138 A | 6/1993 |
| JP | 7-322229 A | 12/1995 |
| JP | 8-46942 A | 2/1996 |
| JP | 10-136328 A | 5/1998 |
| JP | 11-046194 A | 2/1999 |
| JP | 2000-023131 A | 1/2000 |
| JP | 2000-214517 A | 8/2000 |
| JP | 2000-253374 A | 9/2000 |
| JP | 2001-69249 A | 3/2001 |

(Continued)

OTHER PUBLICATIONS

Decision of Rejection dated Mar. 15, 2011, issued in corresponding Japanese Patent Application No. 2005-123932.

(Continued)

*Primary Examiner* — Suhan Ni
(74) *Attorney, Agent, or Firm* — Westerman, Hattori, Daniels & Adrian, LLP

(57) ABSTRACT

A videoconference system includes a head office controller (2) and a plurality of local controllers (3A, 3B) which are connected to a conference server (1) by the Internet and a camera-equipped microphone (4) connected to each of the controllers (2, 3A, 3B). Each of the controllers (2, 3A, 3B) includes an operation panel (17) having an utterance request operation means, a reproduction means for reproducing video/audio, a selection means for selecting the camera-equipped microphone (4) or the local controllers (3A, 3B), and an utterance request indicating means for indicating the local position which has made the utterance request.

6 Claims, 6 Drawing Sheets

FOREIGN PATENT DOCUMENTS

| | | | |
|---|---|---|---|
| JP | 2001-211676 | A | 8/2001 |
| JP | 2001-331431 | A | 11/2001 |
| JP | 2002-229428 | A | 8/2002 |
| JP | 2003-163828 | A | 6/2003 |
| JP | 2004-165946 | A | 6/2004 |
| JP | 2004-356743 | A | 12/2004 |
| JP | 2005-311619 | A | 11/2005 |
| WO | 00/44169 | A1 | 7/2000 |
| WO | 2004/103773 | A2 | 12/2004 |

OTHER PUBLICATIONS

International Search Report of PCT/JP2006/308054, date of mailing Aug. 1, 2006.
Chinese Office Action dated May 22, 2009, issued in corresponding Chinese Patent Application No. 2006800133454 with Translation.
Supplementary European Search Report dated Oct. 1, 2010, issued in corresponding European Patent Application No. 06731983.0.
Japanese Office Action dated Oct. 19, 2010, issued in corresponding Japanese Patent Application No. 2005-123932.

VIDEO CONFERENCE SYSTEM

TECHNICAL FIELD

This invention relates to a videoconference system suitable for a video conference connecting a plurality of geographical locations.

BACKGROUND OF THE INVENTION

Recently, several systems which send and receive video and audio to carry out videoconferences have been suggested. There is a known system, for example, which comprises a host side terminal and a plurality of member side terminals connected to the host side terminal by telephone lines. The host side terminal includes a conference connection device; a television phone; a screen dividing device which divides a screen into multiple regions and allocates attendees' video to each divided region; a monitor television for displaying a video including the attendees' video allocated to each divided region; and a remote video transmission circuit which determines transmission timing of members' videos to the host side terminal. The plurality of member side terminals includes the television phone and the remote video transmission circuit (see Japanese Unexamined Laid-open Patent Publication No. H4-140990).

There is also a known multi-geographical-location videoconference system which comprises a multi-geographical-location videoconference control device and a videoconference/telephone terminal connected to the multi-geographical-location videoconference device via a network. The multi-geographical-location videoconference control device contains a plurality of videoconference/telephone terminals, controls the multi-geographical-location videoconference where video and audio are exchanged among these videoconference/telephone terminals, and controls a configuration of the multi-geographical-location videoconference in accordance with a push button signal from the videoconference/telephone terminals (see Japanese Unexamined Laid-open Patent Publication No. 2001-69249).

Moreover, the present inventor has filed a Japanese patent application of a communication system which comprises a local administrator server connected to the television phone and a local server wherein the local server is connected to the television phone and a camera-equipped-microphone including a mirror. Video and audio signals, from the television phone selected by the local administrator server or from a camera-equipped-microphone selected by a local server which is selected by the local administrator server, are delivered to all the television phones (Japanese Patent Application No. 2004-124629).

However, because an administrator at a head office or a local office runs a conference by operating an administrator computer or a line switching device while viewing and listening to a television phone, an operating procedure is complicated; it is easy to lose concentration; and who is requesting utterance etc. tends to be overlooked.

SUMMARY OF THE INVENTION

An objective of this invention is to provide a videoconference system capable of running a videoconference by connecting a plurality of geographically separate locations; capable of suppressing an increase in cost even if the conference attendees are large in number; simplifying an operation to control the conference for the administrator at the head office and the local office; and making it easy to recognize a progress of the conference or an utterance request display at a glance.

The videoconference system according to the present invention comprises a conference server, one head office controller and one or more local controllers, each connected to the conference server via the Internet, and a plurality of camera-equipped microphones connected to each of the head office controller and the local controllers. Each of the plurality of camera-equipped microphones includes an utterance request operation means which is operated when the utterance requests are made. Each of the head office controller and the local controllers is provided with a console panel. Each console panel includes an utterance request operation means, a reproduction means for reproducing video and audio signals delivered from the conference server, a selection means for selecting the connected camera-equipped microphone or the connected local controller, and an utterance request indicating means for indicating, among the connected camera-equipped microphone and the connected local controllers, the local controllers or the camera-equipped microphone whose utterance request operation means are in operation. The conference server delivers, to all of the console panels, video and audio signals received from the camera-equipped microphone selected by the head office controller or the camera-equipped microphone selected in the local controller selected by the head office controller.

According to the videoconference system of the present invention, since each administrator of the head office or the local office can perform a selection operation with one console panel, while checking the reproduced picture and sound and the requester of an utterance, the operation is easy, enabling timely management of a conference timely in accordance with the progress of the conference.

Moreover, since general participants attend a videoconference by sending video and audio by the camera-equipped microphone, there is no need to install a television phone for every participant, and thus, even if the number of attendees of the videoconference increases, the cost can be minimized.

The videoconference system of the present invention can employ the following configuration.

By providing, to the console panel, the speaker indicating means to indicating the location of the camera-equipped microphone which is delivering the video and audio signals, even if the conference is not held among acquaintances but is a large scale conference, the speaker can be realized at a glance.

A television phone is connected via the Internet to each of the head office controller and local controllers. The television phone includes an utterance request operation means. The console panel includes the television phone and the selection means for selecting either camera-equipped microphone or the local controller. The console panel also includes the utterance request indicating means for indicating, among the connected television phone, the local controllers, and the camera-equipped microphones, the television phone, the camera-equipped microphones or the local controllers whose utterance request operation means is under operation; and the speaker indicating means for indicating the location of the television phone or the camera-equipped microphone delivering video and audio signals under transmission. The conference server delivers, to the head office controller and all of the local controllers, video and audio signals received from the television phone or the camera-equipped microphone selected by the head office controller, or from the television phone or the camera-equipped microphone selected in the local controller selected by the head office controller. In this way, it is easy for an individual to join the conference using a television phone. Since the head office controller and the local controller are connected via the Internet to the television phone, each controller can be designed in an Internet compatible standard specification. Accordingly, it is possible to utilize general purpose computers as the controllers by installing software into the computers, and the variety of transferable data is increased.

DETAILED DESCRIPTION OF THE INVENTION

An example 1 of the video conference according to the present invention will be explained by referring to FIGS. 1-5.

Figure 1:
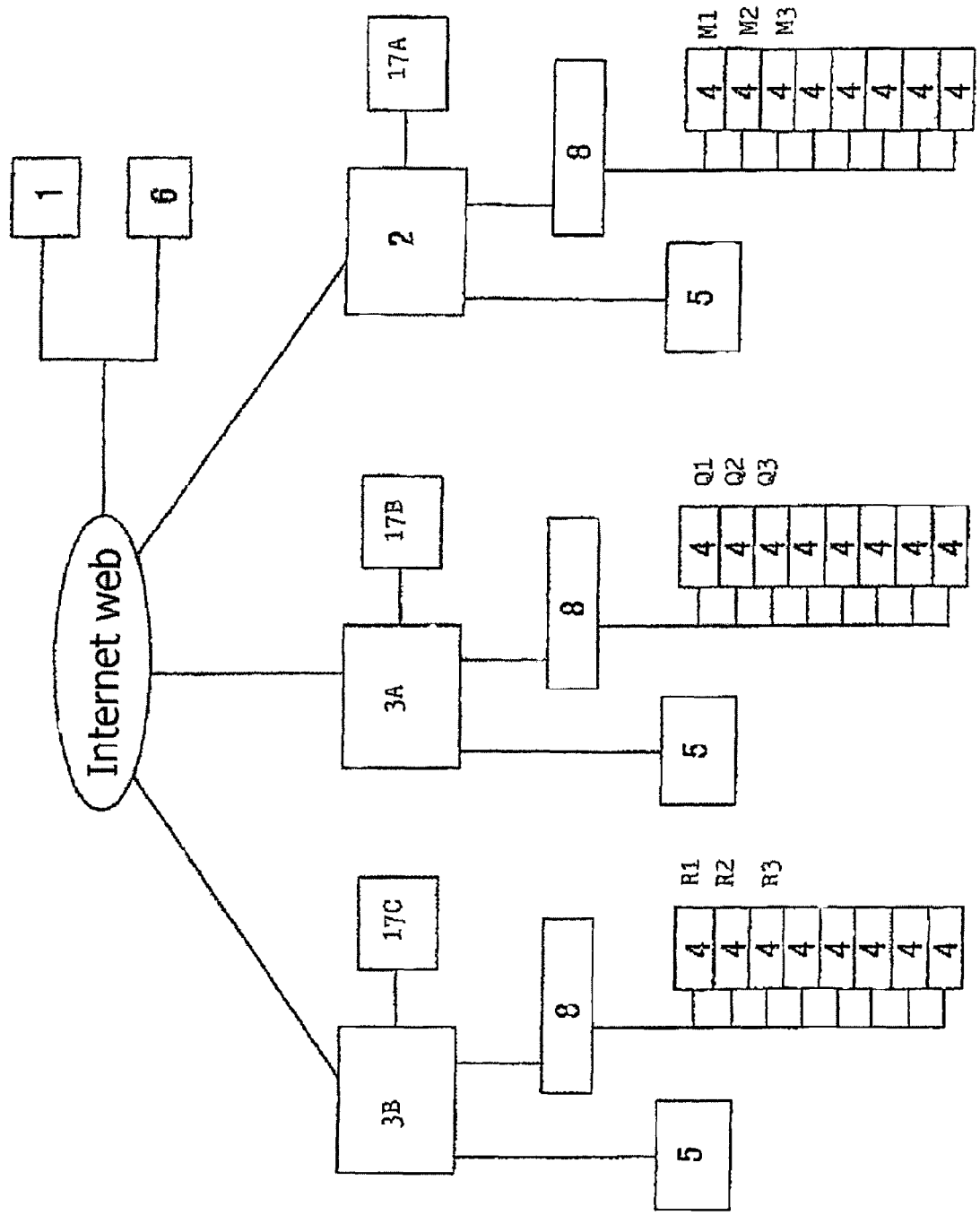
FIG. 1 is a schematic view of an example 1 of a videoconference system according to the present invention.

The videoconference system of the present invention, as shown in FIG. 1, comprises a conference server 1 placed at a head office; one head office controller 2 placed at the head office and connected via Internet to the conference server 1; and a plurality of local controllers 3A and 3B which are placed at each local office and connected to the conference server 1 via the Internet, respectively. Hereinafter, in order to make an explanation easier, an example of installing two local controllers will be explained as shown in FIG. 1. Camera-equipped microphones 4 and a magnified monitor 5 are connected to each of head office controller 2 and local controllers 3A and 3B.

The conference server 1 includes a database function to maintain system information, conference reservation information, and information regarding the head office and each local office and so on. The conference server 1 also includes an application server function to perform system setting, conference reservation, information maintenance and so on. The conference server 1 also includes a multi-geographical-location connection function to send and receive data among the head office controller 2 and the local controllers 3A and 3B.

Also, the conference server 1 manages the connection state of the head office controller 2 and local controllers 3A and 3B, and manages utterance requests from the head office controller 2, the local controllers 3A and 3B and the camera-equipped microphone 4 as described hereinafter.

In order to increase the confidentiality of the conference, it is preferable to use an administrator server 6 so that the communication can be carried out under firewall-installed environment.

Switching devices 8 are connected to each of the head office controller 2 and local controllers 3A and 3B. A plurality of camera-equipped microphones 4 are connected to this switching device 8 via a NTSC (National Television Standard Committee) specification terminal. The example of FIG. 1 shows that three camera-equipped microphones 4 belonging to the head office controller 2 are assigned to the conference attendees M1, M2, and M3; three camera-equipped microphones 4 belonging to the local controller 3A are assigned to the conference attendees Q1, Q2, and Q3; and also three camera-equipped microphones 4 belonging to the local controller 3B are assigned to the conference attendees R1, R2, and R3.

Figure 2:
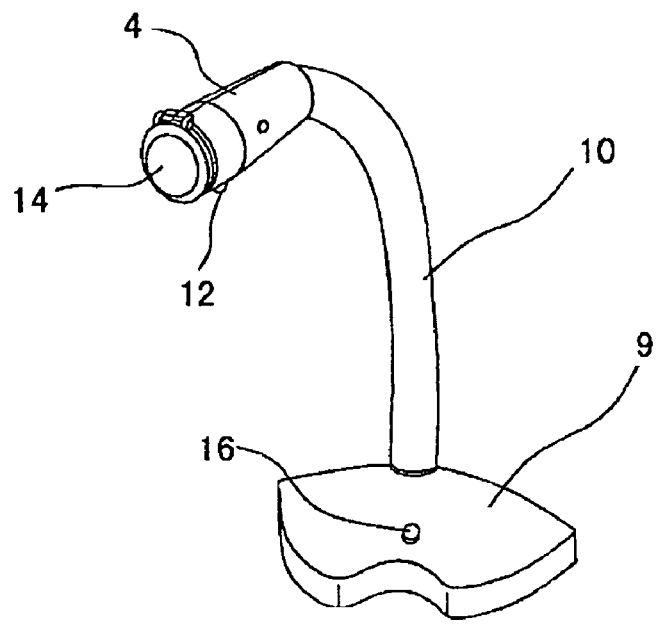
FIG. 2 is a perspective view of a camera-equipped microphone (not in use) used in the videoconference system of FIG. 1.
Figure 3:
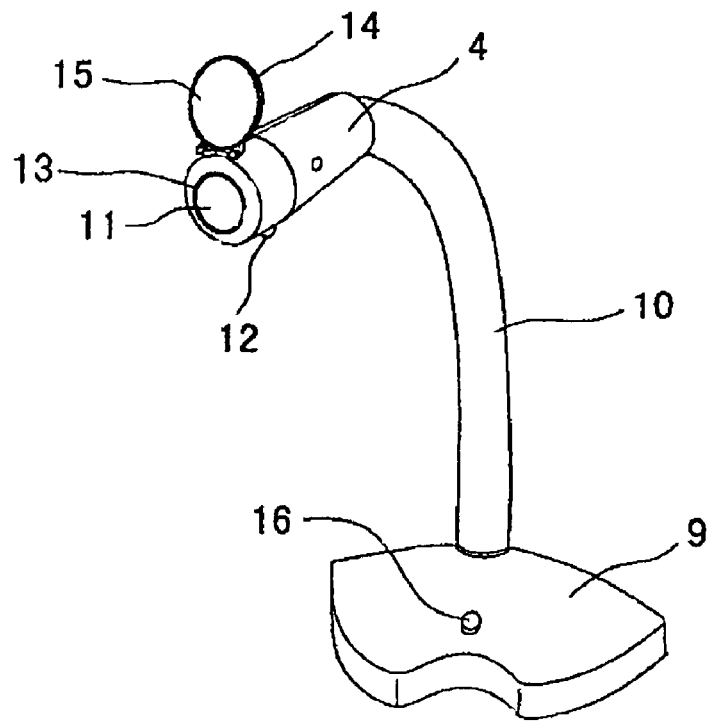
FIG. 3 is a perspective view of the camera-equipped microphone (in use) used in the videoconference system of FIG. 1.

The camera-equipped microphone 4, as shown in FIG. 2 and FIG. 3, is installed on the top end of a support 10 standing from a base 9. The camera-equipped microphone 4 has a lens of CCD camera 11 installed at the tip thereof and has a sound collecting portion 12 at the lower tip portion thereof. Also, lighting equipment such as blue light emitting LED 13 etc. are provided along with the tip circumference of the camera-equipped microphone 4 to surround the lens of the CCD camera 11. This LED 13 indicates that the camera-equipped microphone 4 is in connected and operating status, and also illuminates a speaker's face by blue light to improve the quality of the image.

The lens of the CCD camera 11 is covered with a lid 14 which can be opened or closed. The back side of the lid 14 has a mirror 15. The mirror 15 is configured to stand up to face toward the direction of capture of the CCD camera 11 when the lid 14 is opened upward in case of using the camera-equipped microphone 4.

Moreover, the utterance request means such as a switch 16, which is operated in case of making an utterance request, is provided on the top surface of the base 9.

One camera-equipped microphone 4 is assigned per conference attendee, and the mirror 15 is configured to reflect a face of the attendee sitting in front of the camera-equipped microphone 4. The camera-equipped microphone 4 is configured to be able to send video and audio signals to the conference server 1 via the head office controller 2 or the local controllers 3A and 3B to which the microphone is connected.

The head office controller 2 includes a console panel 17A displayed as an image in a display. Similarly, the local controllers 3A and 3B include the console panels 17B and 17C displayed as an image in a display, respectively.

Figure 4:
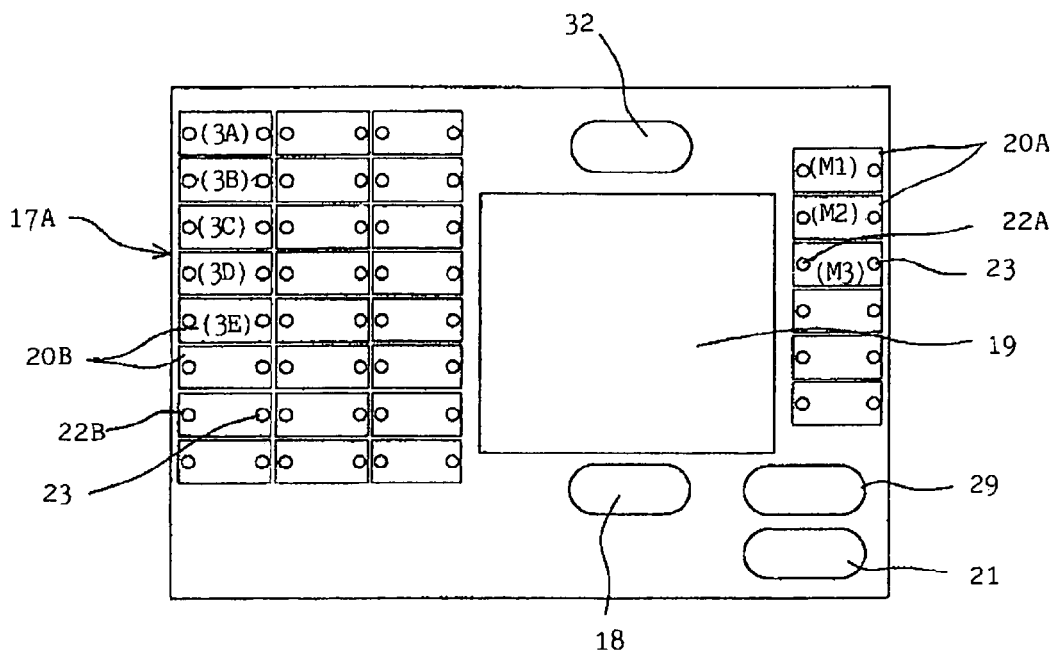
FIG. 4 is a plain view of a console panel of a head office controller used in the videoconference system of FIG. 1.

The console panel 17A of the head office controller 2, as shown in FIG. 4, includes a utterance request operation means such as an utterance request button 18 which is operated in case of making a utterance request to the conference server 1. The console panel 17A also includes a reproducing means composed of a speaker (not shown) and a screen 19 for reproducing the video and audio signals delivered from the conference server 1; a selection means such as touch panel 20A and 20B; a quit button 21; a pause button 29; and a priority button 32.

The touch panels 20A are arranged corresponding to each of the plurality of the camera-equipped microphones 4 connected to the head office controller 2. By pushing one of the panels 20A, one of the camera-equipped microphones 4 may be selected. Also, the touch panels 20B are arranged corresponding to each of the plurality of the local controllers 3A and 3B. By pushing one of the panels 20B, one of the local controllers 3A and 3B may be selected.

These touch panels 20A and 20B are provided with an utterance request indicating lamp 22A and 22B respectively. Among the switches 16 of the plurality of camera-equipped microphones 4 connected to the head office controller 2, by illuminating the utterance request indicating lamp 22A of the touch panel 20A corresponding to the switch 16 by which the utterance request is made, it is possible to realize that there was a request from the conference attendees of M1, M2 or M3, who is using the camera-equipped microphone 4. Also, among the plurality of the local controllers 3A and 3B, by illuminating the utterance request indicating lamp 22B of the touch panel 20B corresponding to the local controller 3A or 3B by which utterance request is made, it is possible to realize that there was a request from the conference attendee who belongs to that local controller 3A or 3B.

Figure 5:
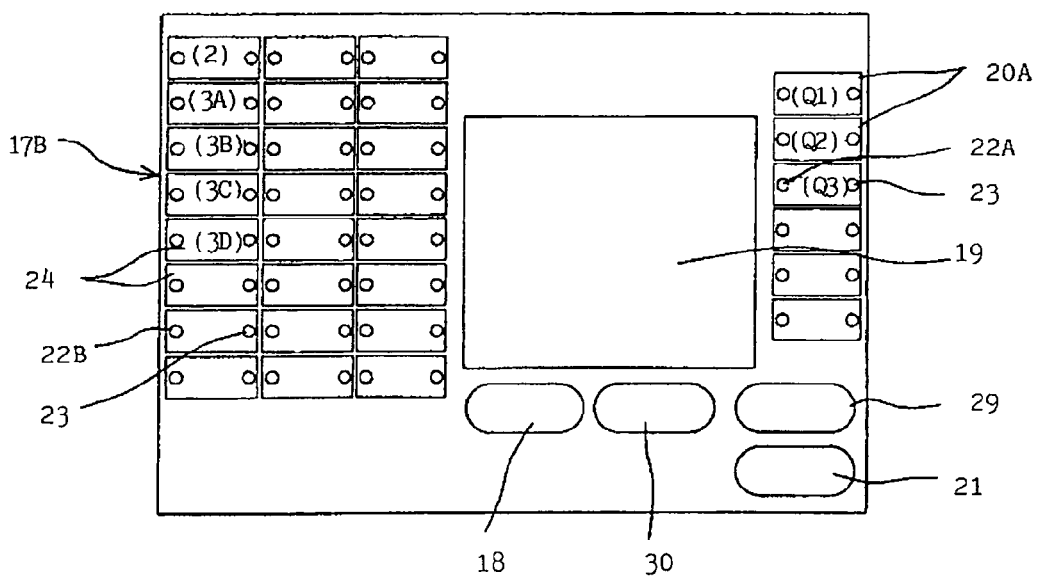
FIG. 5 is a plain view of the console panel of a local controller used in the videoconference system of FIG. 1.

The console panels 17B and 17C of the local controllers 3A and 3B include a location display part 24 to display the local controller 3A and 3B as shown in FIG. 5, instead of the touch panels 20B (FIG. 4) for selecting the local controllers 3A and 3B. These location display parts 24 are provided with both the utterance request indicating lamp 22 and a speaker indicating lamp 23. Moreover, the console panel 17B and 17C of the local controllers 3A and 3B have an utterance request cancel button 30, respectively.

The magnified monitor 5 respectively connected to the head office controller 2 and the local controllers 3A and 3B reproduces video and audio signals delivered from the conference server 1.

The full screen of the magnified monitor 5 can be divided into a plurality of sections. In each section, the speaker's video and the video sent from the head office controller 2 can be reproduced, while in the other sections, video sent from the other local controllers 3A and 3B can be projected in turn for a certain interval. In this case, an expansion screen button and a normal screen button are prepared in the console panel 17A, 17B and 17C, and by operating this expansion screen button and the normal screen button, it is possible to switch between an expanded screen and a normal screen divided as mentioned above. In the expanded screen, the speaker's video or the video from the head office controller 2 can be expanded to display the expanded image on the full screen of the magnified monitor 5.

The videoconference using this videoconference system is performed in the following process.

Upon turning on the power of the head office controller 2 and the local controllers 3A and 3B, a main menu is displayed in each display of the head office controller 2 and the local controllers 3A and 3B. If a videoconference system is selected in the main menu, the images of the console panels 17A, 17B, and 17C are displayed in the display.

Moreover, the head office controller 2 begins to receive utterance requests via the conference server 1, enabling utterance requests from the camera-equipped microphone 4 connected to the head office controller 2 and from each of the console panel 17B and 17C of the local controllers 3A and 3B.

The console panel 17A of the head office controller 2 is operated by the administrator of the whole conference. On the contrary, the console panels 17B and 17C of the local controllers 3A and 3B are operated by the administrators of the local offices, respectively.

If a conference attendee wants to make an utterance, the attendee first operates the switch 16 of the camera-equipped microphone 4 assigned to the attendee. Then, a signal, notifying that the utterance request is made from that camera-equipped microphone 4, is sent to the conference server 1.

If the camera-equipped microphone 4, the switch 16 of which is operated (utterance request made), is connected to the head office controller 2, a utterance request indicating lamp 22A corresponding to the camera-equipped microphone 4 in the console panel 17A of the head office controller 2 is illuminated. On the contrary, if the camera-equipped microphone 4, the switch 16 of which is operated (utterance request made), is connected to the local controller 3A or 3B, a utterance request indicating lamp 22A corresponding to the camera-equipped microphone 4 in the console panel 17B or 17C of the local controller 3A or 3B is illuminated.

If the switch 16 is pressed again after making an utterance request by operating the switch 16 of the camera-equipped microphone 4, the previous utterance request is withdrawn.

Among one or two or more touch panels 20A with an illuminated utterance request indicating lamp 22 on the console panel 17A of the head office controller 2, an administrator operating the console panel 17A selects and pushes touch panel 20A corresponding to the camera-equipped microphone 4 of conference attendees M1, M2, or M3 to whom the administrator would like to give permission to speak. Then, the switching device 8 makes connections between the selected camera-equipped microphone 4 and the head office controller 3, enabling transmission (utterance) from this camera-equipped microphone 4.

Similarly, among one or two or more touch panels 20A with an illuminated utterance request indicating lamp 22 on the console panel 17B or 17C of the local controller 3A or 3B, an administrator operating the console panel 17B or 17C selects and pushes touch panel 20A corresponding to the camera-equipped microphone 4 of conference attendees Q1, Q2 or Q3, or R1, R2 or R3 to whom the administrator would like to give permission to speak. Then, the switching device 8 makes connections between the selected camera-equipped microphone 4 and the local controller 3A or 3B, enabling transmission (utterance) from this camera-equipped microphone 4.

Then, an administrator operating the console panel 17, 17B or 17C with an illuminated utterance request indicating lamp 22, operates the utterance request button 18 in the console panel 17, 17B or 17C. If the console panel, the utterance request button 18 of which is operated, is the console panel 17B or 17C of the local controller 3A or 3B, the utterance request indicating lamp 22B on the console panel 17A of the head office controller 2 is illuminated where the lamp 22B is in the touch panel 20B corresponding to the local controller 3A or 3B.

Meanwhile, the utterance request by operating the utterance request button 18 of the local controller 3A and 3B can be cancelled by operating the utterance request cancel button 30.

The administrator operating the console panel 17A of the head office controller 2, by looking at the utterance request indicating lamps 22A and 22B in the console panel 17A, determines whether to give permission to the conference attendee using the camera-equipped microphone 4 connected to the head office controller 2 or to give permission to the conference attendee using the camera-equipped microphone 4 connected to the local controller 3A or 3B.

When the administrator operating the console panel 17A of the head office controller 2 wants to give a permission to make an utterance for the conference attendee M1, M2, or M3 who is using the camera-equipped microphone 4 connected to the head office controller 2, the administrator operates the touch panel 20A (in which the utterance request indicating lamp 22A is illuminated) on the console panel 17A where the touch panel 20A corresponds to the camera-equipped microphone 4. On the contrary, when the administrator operating the console panel 17A of the head office controller 2 wants to give a permission to make an utterance for the conference attendees via the camera-equipped microphone 4 connected to the local controller 3A or 3B, the administrator operates the touch panel 20B (in which the utterance request indicating lamp 22B is illuminated) on the console panel 17A where the touch panel 20B corresponds to the local controller 3A or 3B.

In this way, by selecting and pressing one of the touch panels 20A and 20B on the console panel 17A, if the utterance is permitted via the specific camera-equipped microphone 4 connected to the head office controller 2, or if the utterance is permitted via the specific camera-equipped microphone 4 connected to the local controller 3A or 3B, voice and audio signals of the conference attendee are sent from the camera-equipped microphone 4 to the conference server 1. The conference server 1 delivers the received video and audio signals to all of the console panels 17A, 17B and 17C, and the magnified monitor 5, which are connected to the head office controller 2 and the local controllers 3A and 3B. As a result, the conference attendee using the camera-equipped microphone 4 can clearly hear and view the delivered video and audio by the magnified monitor 5.

When the video and audio signals are transmitted through the camera-equipped microphone 4 connected to the head office controller 2, the speaker indicating lamp 23 of the touch panel 20A corresponding to the camera-equipped microphone 4 is illuminated where the touch panel 20A is on the console panel 17A connected to the head office controller 2. In addition, the speaker indicating lamps 23 of the location display part 24 corresponding to the controller 2 are illuminated where the location display part 24 is on the console panels 17B and 17C connected to each local controller 3A and 3B.

On the contrary, when the video and audio signals are transmitted through the camera-equipped microphone 4 connected to one of the local controllers (hereinafter local controller 3A is assumed), on the console panel 17A connected to the head office controller 2, the speaker indicating lamp 23 of the touch panel 20B corresponding to the local controller 3A containing the camera-equipped microphone 4 is illuminated. On the console panel 17B connected to the local controller 3A, the speaker indicating lamp 23 of the touch panel 20A corresponding to the camera-equipped microphone 4 is illuminated. On the console panel 17C connected to the other local controller 3B, the speaker indicating lamp 23 of the location display part 24 corresponding to the local controller 3A containing the camera-equipped microphone 4 is illuminated.

When the priority button 32 of the console panel 17A is operated by the administrator operating the console panel 17A of the head office controller 2, the conference server 1 primarily accepts the utterance request from a special camera-equipped microphone 4 connected to the head office controller 2 (a camera-equipped microphone 4 used by an attendee who is in upper level class), and transmits video and audio signals sent from the special camera-equipped microphone 4.

When the pause button 29 along with the touch panels 20A and 20B on the console panel 17A are operated by the administrator operating the console panel 17A of the head office controller 2, the transmission from the camera-equipped microphone 4 or the transmission from the local controllers 3A and 3B corresponding to the touch panels 20A and 20B are disabled, also, a pause mark is displayed in the areas of the touch panel 20A and 20B. However, by operating the pause button 29 again, the pause condition is cancelled.

When the pause button 29 along with the touch panels 20A on the console panel 17A are operated by the administrator operating the console panels 17B and 17C of the local controller 3A and 3B, the transmission from the camera-equipped microphone 4 corresponding to the touch panels 20A is disabled, also, a pause mark is displayed in the area of touch panel 20A. However, by operating the pause button 29 again, the pause condition is cancelled.

When each administrator operating the console panel 17A of the head office controller 2 or the console panel 17B or 17C of the local controllers 3A and 3B judges that the utterance of the conference attendee (the speaker) is finished, the administrator cancels selected condition for the camera-equipped microphone 4 by operating the quit button 21 on the console panel 17, and stops transmission of the video and audio signal from the conference server 1.

Then, in order to select the next speaker, the administrator operating the console panel 17A of the head office controller 2, operates (selects) touch panel 20A corresponding to the camera-equipped microphone 4 which belongs to the head office controller 2 by operating the touch panel 20 A of the console panel 17A, or operates the touch panel 20B corresponding to one of the local controllers 3A and 3B.

Once the conference is ended, after canceling the selection for the camera-equipped microphone 4 by operating the quit button 21 of each console panel 17A, 17B or 17C, a finish screen is displayed in the screen 19 when the quit button 21 is operated again. Then, by selecting quit in the finish screen, the videoconference system can be terminated.

An example 2 of the video conference system according to the present invention will be explained by referring to FIG. 6.

Figure 6:
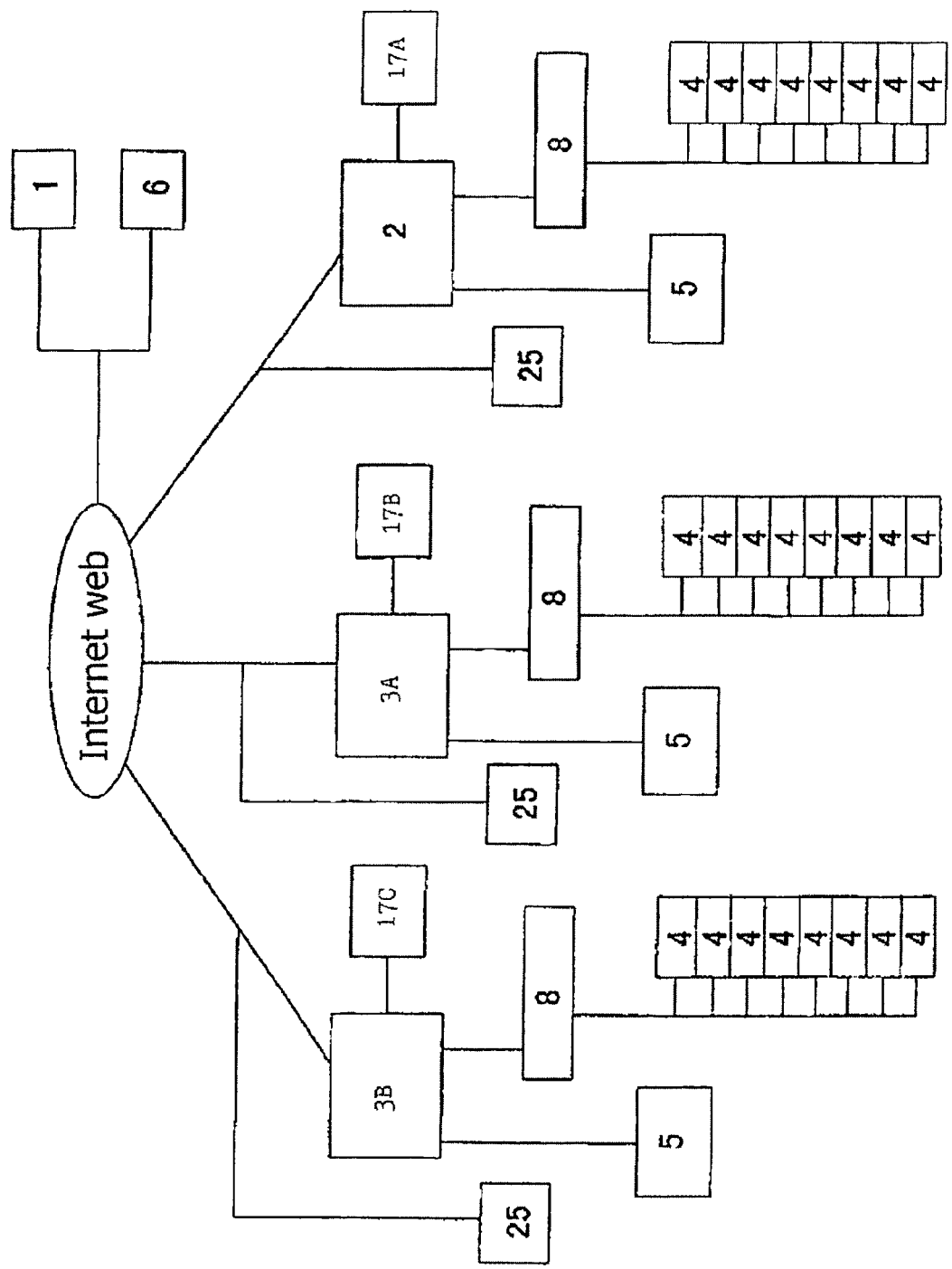
FIG. 6 is a schematic view of an example 2 of a videoconference system according to the present invention.

In this example, as shown in FIG. 6, one or more television phones 25 are connected via the Internet to the head office controller 2 and the local controllers 3, respectively. The television phone 25 may be located at the president's room or board member's rooms of the headquarters, or the branch manager's room of a branch, etc., or may be used by an individual conference attendee.

Also, the television phone 25 can be switched between the mode where the television phone 25 is used as an ordinary television phone and the mode where it is used in a videoconference. The television phone 25 is provided with an utterance request means such as push button which is operated when utterance requests are made.

In addition, each television phone 25 is configured to be able to send and receive video and audio signals from the conference server 1 via the head office controller 2 or the local controller 3A or 3B to which the television phone 25 is connected.

The console panels 17A, 17B and 17C of the head office controller 2 and the local controllers 3A and 3B include utterance request operation means such as the utterance request button 18 to be operated when an utterance request is made to the conference server 1. The console panels 17A, 17B and 17C also include reproduction means composed of a speaker (not shown) and a screen 19 which reproduces the video and audio signals delivered from the conference server 1; a selection means such as the touch panel 20 which corresponds to the connected local controller 3, the camera-equipped microphone 4, and the television phone 25, and selects one of them; and a quit button 21.

Also, either if the television phone 25 or the camera-equipped microphone 4 is selected at the head office controller 2, or if the television phone 25 or the camera-equipped microphone 4 is selected at the local controller 3A or 3B which is selected by the head office controller 2, the video and audio signals are sent from the television phone 25 or the camera-equipped microphone 4 to the conference server 1, and the conference server 1 distributes this video and audio signals.

Since the other structures are almost identical to the example 1, the detailed explanation is omitted by using the like reference to the like element.

An example 3 of the videoconference system according to the present invention will be explained by referring to FIG. 7.

Figure 7:
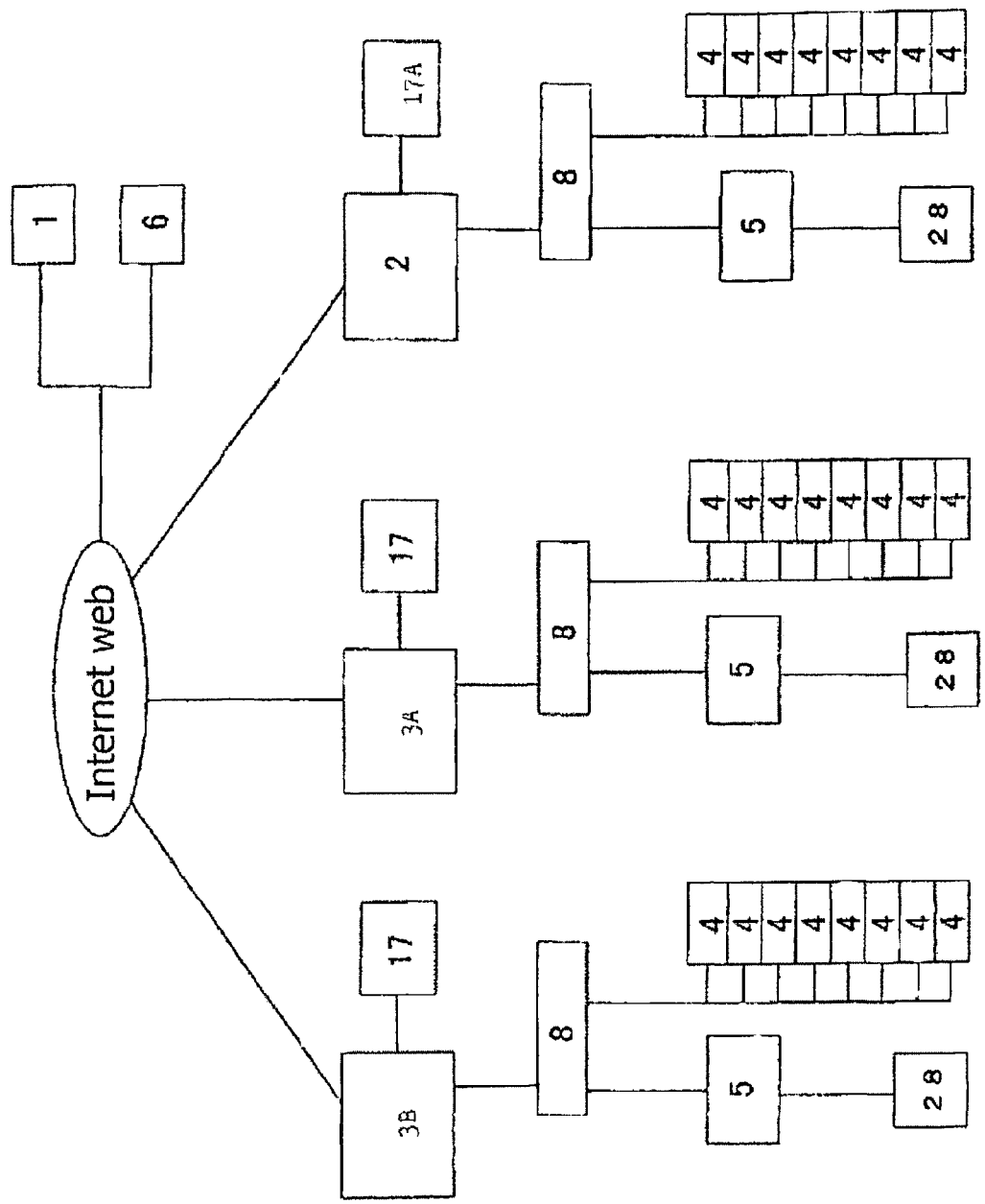
FIG. 7 is a schematic view of an example 3 of a videoconference system according to the present invention.

In this example, as shown in FIG. 7, the magnified monitor 5 is connected to each head office controller 2 and local controllers 3A and 3B via the switching device 8. Also, personal computers 28 are connected via the switching device 8 and the magnified monitor 5.

If the speaker sends computer data such as CAD data from the personal computer 28, the computer data is sent to the conference server 1 via the magnified monitor 5, the switching device 8 and the head office controller 2 or the local controller 3A or 3B. The conference server 1 delivers the computer data to all of the console panels 17 such that the data can be used as a conference material.

Also, a reservation of the conference can be made to the conference server 1 by the personal computer 28, and the holding of the conference can be notified by sending email from the conference server 1 to the personal computers 28 connected to the head office controller 2 and the local controller 3A and 3B.

The other structures are similar to the examples 1 and 2.

Moreover, the number of the local controllers 3A and 3B or the number of the camera-equipped microphone 4 are not limited to what shown in the drawings, but can be changed optionally.

Also, by providing a plurality of controllers which are capable of switching between functions of the head office controller 2 and functions of the local controllers 3A, 3B, . . . , and by switching the functions, it is possible to use one of the controllers as the head office controller 2, and the others as the local controllers 3A, 3B, . . . .

In addition, if the screen 19 of the console panels 17A, 17B and 17C are large enough for the conference attendees to watch readily, there is no need to install the magnified monitor 5.

If the conference is small and among acquaintances, the speaker indicating lamps 23 could be omitted.

Figure 8:
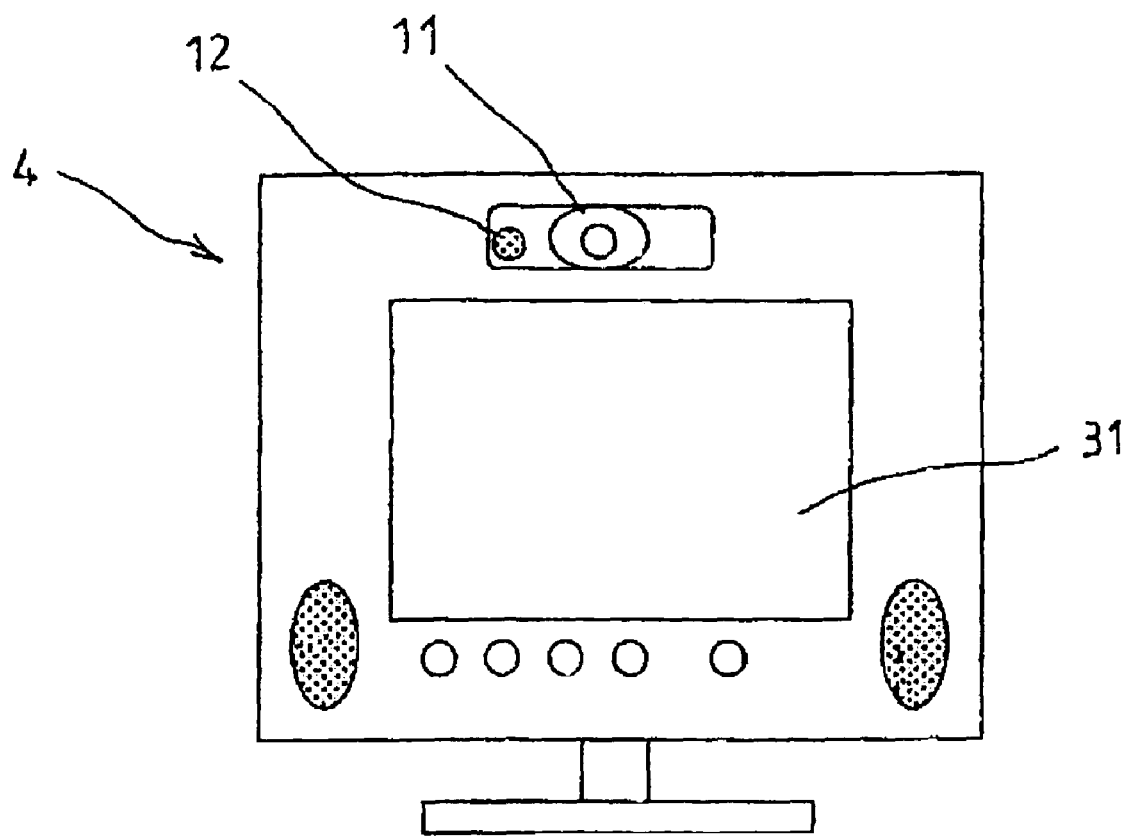
FIG. 8 is a front view of the camera-equipped microphone with a monitor used in the videoconference system of FIG. 7.

More over, although the cost becomes a bit high, as shown in FIG. 8, it is also possible to install the monitor 31 to the camera-equipped microphone 4 which reproduces the video and audio signals delivered from the server 1. In this case, since the picture of a speaker can be displayed on the monitor 31 so that the speaker can check his or her eyes and expression by the picture, it is not necessary to install a mirror in the camera-equipped microphone.

Furthermore, if it is enabled to display the past conference data or the schedule of the future conference on the monitor 19 by operating the button of the console panels 17A, 17B and 17C, it is much more convenient.

What is claimed is:

1. A videoconference system comprising:
a conference server;
a head office controller and one or more local controllers, each connected to the conference server via an Internet connection; and
a plurality of camera-equipped microphones connected to the head office controller and the local controllers respectively,
wherein each of the plurality of camera-equipped microphones includes an utterance request operation means to be operated when an utterance request is made,
wherein the head office controller and the local controllers include a console panel respectively,
wherein the console panel includes:
an utterance request operation means,
a reproduction means for reproducing video and audio signals delivered from the conference server,
a selection means for selecting one of the connected camera-equipped microphones or the connected local controllers, and
an utterance request indicating means for indicating, among the connected camera-equipped microphones and the connected local controllers, the local controller or the camera-equipped microphone whose utterance request operation means is under operation,
wherein the conference server delivers, to all of the console panels, video and audio signals received from the camera-equipped microphone selected by the head office controller or the camera-equipped microphone selected in the local controller selected by the head office controller.

2. The videoconference system according to claim 1, wherein the console panel includes a speaker indicating means for indicating a location of the camera-equipped microphone providing the video and audio signals under delivery.

3. The video conference system according to claim 1, further comprising a television phone connected via the Internet connection to the head office controller and the local controllers respectively,
wherein the television phone includes an utterance request operation means,
wherein each console panel further includes:
a selection means for selecting the television phone, the camera-equipped microphones or the local controllers,
the utterance request indicating means for indicating, among the connected television phone, the local controllers and the camera-equipped microphones, the television phone, the camera-equipped microphones or the local controllers whose utterance request operation means is under operation, and
the speaker indicating means for indicating the location of the television phone or the camera-equipped microphone providing video and audio signals,
wherein the conference server delivers, to the head office controller and all of the local controllers, video and audio signals received from the television phone or the camera-equipped microphone selected by the head office controller or from the television phone or the camera-equipped microphone selected by the local controller selected by the head office controller.

4. The videoconference system according to claim 1, wherein a magnified monitor for reproducing the video and audio signals delivered from the conference server is connected to the head office controller and the local controllers.

5. The videoconference system according to claim 1, wherein a personal computer is connected to the head office controller and the local controllers.

6. The videoconference system according to claim 1, wherein a mirror is provided to the camera-equipped microphone.

* * * * *